United States Patent
Mangapuram et al.

(10) Patent No.: US 9,952,583 B2
(45) Date of Patent: Apr. 24, 2018

(54) SYSTEM AND METHOD FOR IDENTIFICATION OF IMPLEMENT MOTION IN A POWER TOOL

(71) Applicants: Robert Bosch Tool Corporation, Broadview, IL (US); Robert Bosch GmbH, Stuttgart (DE)

(72) Inventors: Sai Yogesh Kumar Mangapuram, Bangalore (IN); Bharadwaja Maharshi Ramaswamy, Bangalore (IN); Niranjan Sathyanarayanarao Krishnarao, Bangalore (IN); Vishwanatha Manevarthe Srikantiah, Bangalore (IN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1198 days.

(21) Appl. No.: 13/827,897

(22) Filed: Mar. 14, 2013

(65) Prior Publication Data
US 2014/0094957 A1    Apr. 3, 2014

(30) Foreign Application Priority Data
Sep. 28, 2012    (IN) ............ 4062/CHE/2012

(51) Int. Cl.
G05B 19/406    (2006.01)
G01P 13/00    (2006.01)
B23Q 11/00    (2006.01)

(52) U.S. Cl.
CPC ........ *G05B 19/406* (2013.01); *B23Q 11/0082* (2013.01); *G01P 13/00* (2013.01)

(58) Field of Classification Search
CPC .... G05B 19/406; B23Q 11/0082; G01P 13/00
See application file for complete search history.

(56) References Cited

U.S. PATENT DOCUMENTS

| 5,905,354 A | 5/1999 | Futsuhara et al. |
| 7,536,238 B2 | 5/2009 | Gass |

(Continued)

FOREIGN PATENT DOCUMENTS

EP    0647854 A1    4/1995

OTHER PUBLICATIONS

International Search Report and Written Opinion corresponding to PCT Application No. PCT/IN2013/000588, dated Feb. 10, 2014 (10 pages).

*Primary Examiner* — Janet Suglo
(74) *Attorney, Agent, or Firm* — Maginot Moore & Beck LLP

(57) ABSTRACT

A method of operating a power tool identifies motion of an implement in a power tool. The method includes obtaining a plurality of samples of an electrical signal that passes through the implement, identifying a parameter for the plurality of samples corresponding to a variation in values of predetermined groups of samples in the plurality of samples, updating a status for the implement with a first status indicating that the implement is not moving with reference to the identified parameter being less than a predetermined threshold, and updating a status for the implement with a second status indicating that the implement is moving with reference to the identified parameter being greater than the predetermined threshold.

4 Claims, 8 Drawing Sheets

(56) References Cited

U.S. PATENT DOCUMENTS

| | | |
|---|---|---|
| 7,739,934 B2 | 6/2010 | Tetelbaum et al. |
| 7,888,826 B1 | 2/2011 | Shafer et al. |
| 8,371,196 B2 * | 2/2013 | Gass .................. B23D 47/08 192/129 R |
| 2008/0078470 A1 * | 4/2008 | O'Branion ............ B23D 47/08 144/356 |
| 2009/0241748 A1 * | 10/2009 | Keller .................. B27G 19/02 83/522.13 |
| 2010/0206145 A1 * | 8/2010 | Tetelbaum ........... B23D 59/001 83/13 |

\* cited by examiner

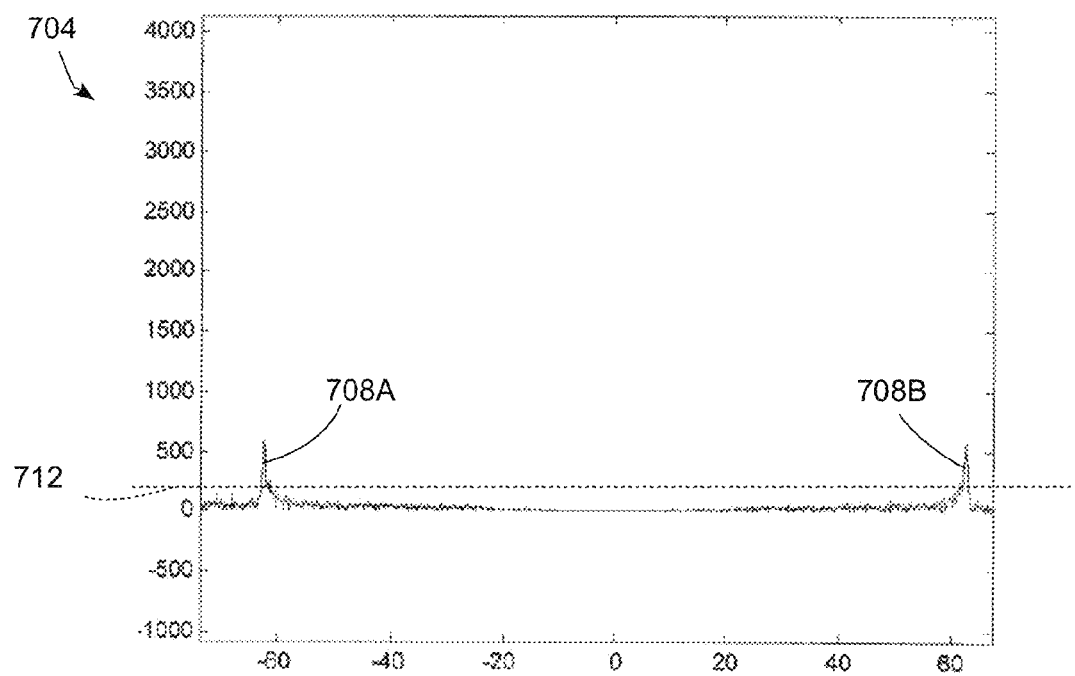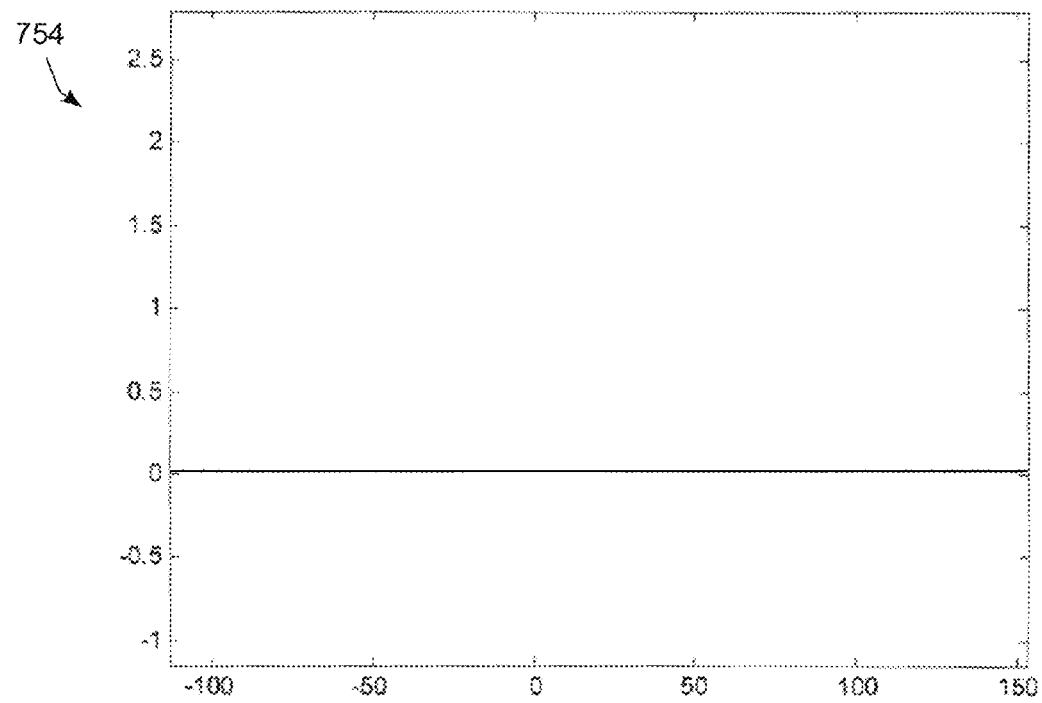
FIG. 7

SYSTEM AND METHOD FOR IDENTIFICATION OF IMPLEMENT MOTION IN A POWER TOOL

CLAIM OF PRIORITY

This application claims priority to a pending Indian application with serial number 4062/CHE/2012, which is entitled "SYSTEM AND METHOD FOR IDENTIFICATION OF IMPLEMENT MOTION IN A POWER TOOL," and was filed on Sep. 28, 2012.

TECHNICAL FIELD

This disclosure relates generally to power tools, and, more specifically, to systems and methods for detecting movement of an implement in a power tool.

BACKGROUND

Detection or sensing systems have been developed for use with various kinds of manufacturing equipment and power tools. Such detection systems are operable to trigger a reaction device by detecting or sensing the proximity or contact of some appendage of an operator with some part of the equipment. For example, existing capacitive contact sensing systems in table saws detect contact between the operator and the blade.

FIG. 1 depicts a prior art capacitive sensing based detection system 90 that is incorporated with a table saw 1. The detection system 90 drives an excitation voltage that is electrically coupled to a movable blade 22 of the saw 1, and detects the current drawn from the blade 22. The amplitude or phase of the detected current and/or excitation voltage changes when the blade 22 comes into contact with an electrically conductive object (such as an operator's hand, finger or other body part, as well as work pieces). The characteristics of the changes are used to trigger the operation of a reaction system 92. The reaction system 92 disables operation of the blade 22 by, for example, applying a brake to cease motion of the blade 22 and/or by dropping or otherwise removing the blade 22 from the cutting area. One example of a reaction system 92 uses an explosive charge to drive a stopper (not shown) into the blade 22 to arrest the motion of the blade 22. In addition, or instead, an embodiment of the reaction system 92 drops or collapses a blade support member (not show) to urge the blade 22 below the surface of the table 14.

The embodiment of the detection system 90 shown in FIG. 1 includes an oscillator 10 that generates a time-varying signal on line 12. The time-varying signal is any suitable signal type including, for example, a sine wave, a sum of multiple sine waves, a chirp waveform, a noise signal, etc. The frequency of the signal is chosen to enable a detection system to distinguish between contact with the first object, such as a finger or hand, and a second object, such as wood or other material, to be cut by the power tool. In the embodiment of FIG. 1, the frequency is 1.22 MHz, but other frequencies can also be used, as well as non-sinusoidal wave shapes. The oscillator 10 is referenced to the saw table 14 or other metallic structure as a local ground. As shown in FIG. 1, the blade 22 is disposed vertically in an opening defined by the saw table 14 (or work surface or cutting surface or platform).

The oscillator 10 is connected to two voltage amplifiers or buffers 16, 18 through the line 12. The first voltage amplifier 16 has an output connected to line 20, which operatively connects the output of the oscillator to the saw blade 22. A current sensor 24 operatively connects a signal from line 20 onto line 26 that is fed to an amplifier 28, which is connected to a processor 30 by line 32. The current sensor 24 is, for example, a current sense transformer, a current sense resistor, a Hall Effect current sense device, or other suitable type of current sensor. An output line 34 from the processor 30 is operatively connected to the reaction system 92 so that the processor 30 triggers the reaction system 92 if predetermined conditions are detected indicating, for example, contact between the blade 22 and the first object.

The signal on line 26 is indicative of the instantaneous current drawn by the blade 22. Because the saw blade 22 is in motion during operation of the table saw, the connection is made through an excitation plate 36, which is mounted generally parallel to the blade 22. The plate 36 is driven by the first voltage amplifier 16, and is configured with a capacitance of approximately 100 picoFarad (pF) relative to the blade 22 in the embodiment of FIG. 1. The plate 36 is held in a stable position relative to the side of the blade 22. The excitation plate 36 is configured to follow the blade 22 as the height and bevel angle of the blade 22 are adjusted during operation of the saw 1.

The capacitance between the first object and the saw table 14 (or power line ground if one is present) is in the range of approximately 30-50 pF in the embodiment of FIG. 1. When the capacitance between the excitation plate 36 and the saw blade 22 exceeds the capacitance between the first object and the saw table 14, the detection thresholds are not unduly affected by changes in the plate-to-blade capacitance. In the configuration of FIG. 1, the plate 36 is arranged in parallel with the blade 22 on the side where the blade 22 rests against the arbor 37, so that changes in blade thickness do not affect the clearance between the blade 22 and the plate 36. Other methods of excitation, including contact through the arbor bearings or brush contact with the shaft or the blade, could be used to the same effect.

In the detection system 90, the second-amplifier 18 is connected to a shield 38, and the amplifier 18 drives the shield 38 to the same potential as the excitation plate 36. Also, sensors in the detection system 90 optionally monitor the level of electrical current drawn by the shield 38. The shield 38 extends around the blade 22 underneath the table 14, and is spaced some distance away from the blade 22 on the top of the table 14 in the configuration of FIG. 1. The configuration of the shield 38 reduces the static capacitance between the blade 22 and the table 14, which acts as a ground plane if the table is not electrically connected to an earth ground. In various embodiments, the shield 38 is a continuous pocket of mesh, or some other type of guard that is electrically equivalent to a Faraday cage at the excitation frequencies generated by the oscillator 10. The shield 38 optionally includes a component that moves with the blade adjustments, or is large enough to accommodate the blade's adjustment as well as the various blades that fitted on the table saw. In the configuration of FIG. 1, the shield 38 moves with the blade adjustments, and includes a throat plate area of the table top 14.

The processor 30 performs various pre-processing steps and implements an adaptive trigger that enables detection of conditions indicative of contact between the first object and the blade 22. The processor 30 optionally includes one or more associated analog-to-digital (A/D) converters. The blade current signal from the current sensor 24 is directed to one or more of the A/D converters, which generate a corresponding digital signal. A blade voltage signal representing the voltage drop between the blade 22 and the excitation plate 36 is directed an A/D converter to generate a digital blade voltage signal in some embodiments. The processor 30 receives the digitized signal and performs various digital signal processing operations and/or computes derivative parameters based on the received signal. The processor 30 analyzes or otherwise performs operations on the conditioned blade signal to detect conditions indicative of contact between the first object and the blade 22.

Existing detection systems, such as the system 90 of FIG. 1, identify movement of the blade 22 when a motor in the saw 1 is activated and turns the saw blade. External sensors, such as an RPM gauge, can identify the rotational rate of the motor and the saw blade. During operation, however, the blade 22 can rotate even when the motor is deactivated. For example, when the motor is activated to rotate the blade 22 and subsequently deactivated, the blade 22 continues rotating for several seconds due to the momentum of the blade 22. While external sensing devices can be used to identify movement of the blade 22 even when the motor is deactivated, such sensing devices can be unreliable and increase the complexity of the saw 1. Consequently, improvements to power tools that enable identification of movement of an implement in the power tool when an actuator is deactivated and without requiring additional external sensors would be beneficial.

SUMMARY

In one embodiment, a method for identifying movement of an implement in a power tool has been developed. The method includes obtaining a plurality of samples of an electrical signal that passes through the implement, identifying a parameter for the plurality of samples corresponding to a variation in values of predetermined groups of samples in the plurality of samples, updating a status for the implement with a first status indicating that the implement is not moving with reference to the identified parameter being less than a predetermined threshold, and updating a status for the implement with a second status indicating that the implement is moving with reference to the identified parameter being greater than the predetermined threshold.

In another embodiment, a power tool that is configured to identify movement of an implement has been developed. The power tool includes an actuator configured to move an implement, a clock source configured to generate a time varying electrical signal that passes through the implement, a memory, and a controller operatively connected to the actuator and the memory. The controller is configured to obtain a plurality of samples of the electrical signal, identify a parameter for the plurality of samples corresponding to a variation in values of predetermined groups of samples in the plurality of samples, update a status for the implement stored in the memory with a first status indicating that the implement is not moving with reference to the identified parameter being less than a predetermined threshold stored in the memory, and update the status for the implement in the memory with a second status indicating that the implement is moving with reference to the identified parameter being greater than the predetermined threshold stored in the memory.

BRIEF DESCRIPTION OF THE DRAWINGS

FIG. 7 is a graph depicting frequency responses of an in-phase component of a signal through an implement as the implement is moving and as the implement is halted.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "power tool" refers to any tool with one or more moving parts that are moved by an actuator, such as an electric motor, an internal combustion engine, a hydraulic or pneumatic cylinder, and the like. For example, power tools include, but are not limited to, bevel saws, miter saws, table saws, circular saws, reciprocating saws, jig saws, band saws, cold saws, cutters, impact drives, angler grinders, drills, jointers, nail drivers, sanders, trimmers, and routers. As used herein, the term "implement" refers to a moving part of the power tool that is at least partially exposed during operation of the power tool. Examples of implements in power tools include, but are not limited to, rotating and reciprocating saw blades, drill bits, routing bits, grinding disks, grinding wheels, and the like. As described below, a sensing circuit integrated with a power tool is used to halt the movement of the implement to avoid contact between a human operator and the implement while the implement is moving.

Figure 5:
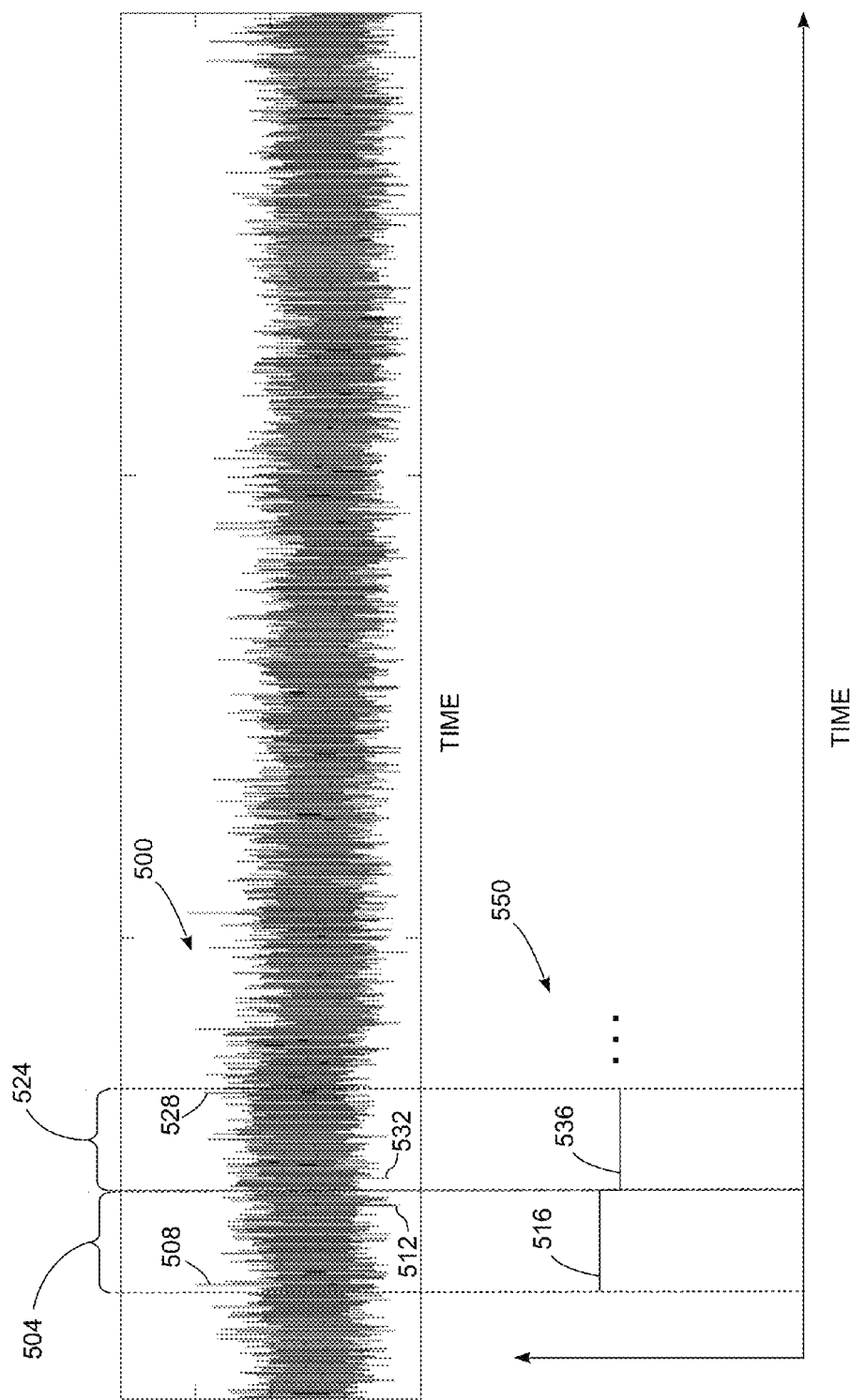
FIG. 5 is a graph depicting in-phase components of a signal that passes through an implement in a power tool and a corresponding graph of max-min values for time period intervals in the signal.

As used herein, the term "max-min" is an abbreviation for "maximum-minimum" and refers to an identified difference between a maximum value and minimum value of a signal identified in a plurality of samples of the signal obtained during a time period. For example, FIG. 5 depicts a graph of in-phase signal amplitude values 500 in series over time for a time-varying electrical signal that passes through an implement in a power tool. Each of the vertical lines depicted in FIG. 5 represents a single sample generated from the signal with some amplitude values having positive or negative values due to changes in the amplitude of the signal. As used herein, the term "series" or "series of samples" refers to a plurality of samples identified in the signal over time with the samples being ordered based on the time at which each sample is obtained from the signal. For example, the periodic time intervals 512 and 524 in FIG. 5 each include a series of samples that are obtained at a predetermined sampling rate over time. During a first periodic time interval 504, the sample 508 has the maximum value for the samples obtained during interval 504 and the sample 512 has the minimum value for the same samples. Thus, the max-min value for the periodic time interval 504 is the difference between the values of samples 508 and 512, which is represented by the line 516 in a max-min plot 550. Similarly, in the periodic time interval 524, the sample 528 has the maximum value for the samples obtained in the interval 524 and the sample 532 has the minimum value for the same samples, and the max-min graph 550 depicts the difference 536 between the samples. Each max-min value in the graph 550 is greater than or equal to zero, with a max-min value of zero indicating that each of the samples in the graph 500 has the same value during the predetermined time period. As described in more detail below, the max-min values of an electrical signal that passes through an implement in a power tool change when the implement contacts an object, such as a portion of the human body.

Figure 1:
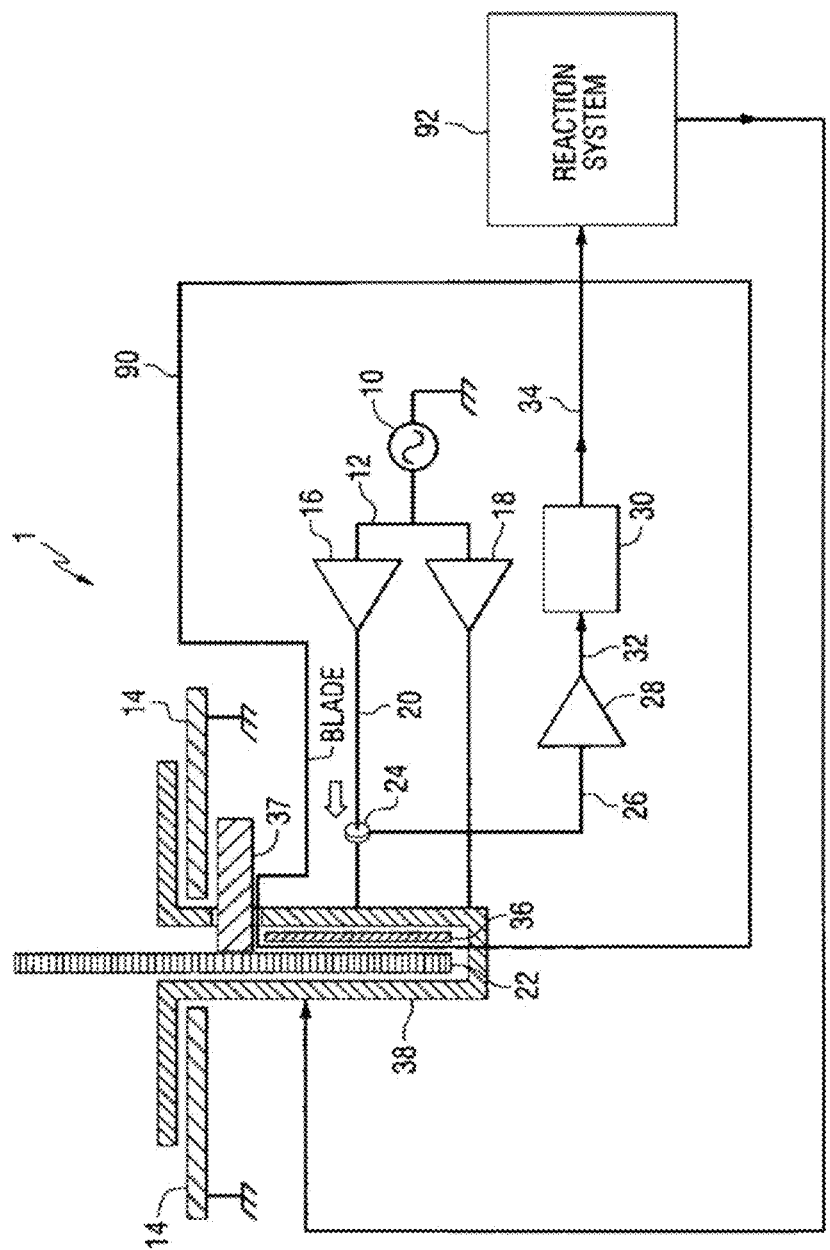
FIG. 1 is a diagram of a prior art table saw including a prior art detection system for detecting contact between a human and a saw blade.
Figure 2:
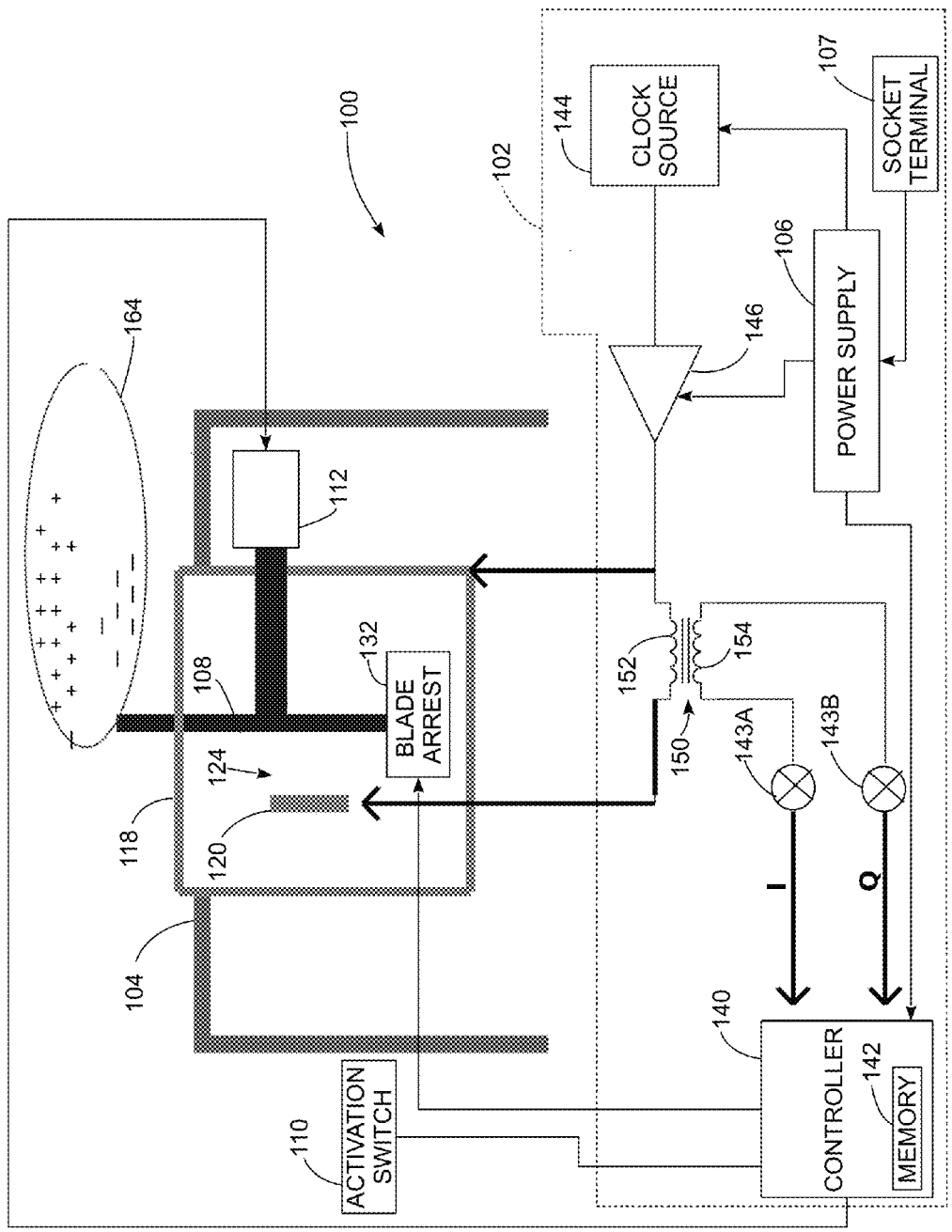
FIG. 2 is a block diagram of a table saw that is configured to identify if a saw blade in the saw is in contact with an object prior to rotating the saw blade.

FIG. 2 depicts a table saw 100. The table saw 100 includes a table 104 through which a saw blade 108 extends for cutting work pieces, such as pieces of wood. The table saw 100 also includes an electric motor 112, a blade enclosure 118, and a blade arrest device 132. A plate 120 and the blade 108 form a capacitor 124 where a small air gap between the plate 120 and the blade 108 acts as a dielectric. In different embodiments, the plate 120 is or includes a capacitive, resistive, projective capacitive, optical, thermal, near infrared or other suitable sensing mechanism that either senses contact between the blade and an object or detects an object that approaches the blade 108. The blade enclosure 118 is electrically connected to the saw blade 108. The general configuration of the table 104, blade 108, and motor 112 are well known to the art for use in cutting work pieces and are not described in greater detail herein. Some components that are commonly used in table saws, such as guides for work pieces, blade height adjustment mechanisms, and blade guards are omitted from FIG. 2 for clarity.

The saw 100 includes a printed circuit card 102 to which a sensing circuit, which includes a clock source 144, driver amplifier 146, transformer 150 and a controller 140, are mounted. An electrical terminal socket 107, which is mounted on the printed circuit card 102 in FIG. 2 or otherwise electrically connected to the switched power supply 106 in another embodiment, receives an alternating current (AC) electrical power signal from an external power source, such as a generator or electrical utility provider. The switched power supply 106 converts the AC power signal from the external power source to a direct current (DC) electrical power signal at one or more voltage levels to supply power to the controller 140, clock source 144, and amplifier 146. The printed circuit card 102 and the components mounted on the printed circuit card 102 are electrically isolated from an earth ground. The power supply 106 serves as a local ground for the components mounted to the printed circuit card 102.

In the saw 100, the clock source 144 and driving amplifier 146 in the sensing circuit generate a time varying electrical signal that is directed through a primary winding 152 in the transformer 150, the capacitive coupling plate 120, the blade 108, and the blade enclosure 118. The time varying electrical signal is referred to a "sensing current" because the controller 140 senses contact between the blade 108 and a portion of a human body with reference to changes in the magnitude of the sensing current. The time varying electrical signal is a complex valued signal that includes both an in-phase component and quadrature component. The sensing current passes through the primary winding 152 in the transformer 150 to the plate 120. The changes in the primary winding caused by discharges between the plate 120 and the blade 108 produce an excitation signal in the secondary winding 154 of the transformer 150. The excitation signal is another complex valued signal that corresponds to the sensing current passing through the primary winding 152.

The controller 140 in the sensing circuit is operatively connected to the motor 112, the secondary winding 154 in the transformer 150, a mechanical blade arresting device 132. The controller 140 includes one or more digital logic devices including general purpose central processing units (CPUs), microcontrollers, digital signal processors (DSPs), analog to digital converters (ADCs), field programmable gate arrays (FPGAs), application specific integrated circuits (ASICs) and any other digital logic devices that are suitable for operation of the saw 100. The controller 140 includes a memory 142 that stores programmed instructions for the operation of the controller 140, and data corresponding to a threshold of max-min variations, a variance threshold, or a frequency response threshold that are used to identify if samples obtained from a sensing current flowing through the blade 108 indicate that the saw blade 108 is rotating or is halted.

During operation of the sensing circuit, the clock source 144 generates a time varying signal, such as sinusoidal waveform, at a predetermined frequency. In the embodiment of FIG. 2, the clock source 144 is configured to generate a signal at a frequency of 1.22 MHz, which is known to propagate through the human body. The amplifier 146 generates the sensing current as an amplified version of the signal from the clock source 144 with sufficient amplitude to drive the transformer 150 and capacitor 124 for detection by the controller 140.

During operation of the sensing circuit, the controller 140 receives the in-phase component I of the excitation signal in the secondary winding 154 through a first demodulator 143A and the quadrature component Q of the excitation signal through a second demodulator 143B. The transformer 150 isolates the sensing current flowing through the primary winding 152, plate 120, saw blade 108, and blade enclosure 118 from demodulators 143A and 143B that supply the in-phase and quadrature phase components of the signal, respectively, to the controller 140. Since the demodulators 143A and 143B generate electrical noise, the transformer 150 reduces or eliminates the effects of the noise on the primary winding 152 and sensing current. In one configuration, the transformer 150 is a 1:1 transformer where the primary winding 152 and secondary winding 154 have an equal number of turns. In alternative configurations, the ratio of windings in the primary winding 152 and secondary winding 154 are selected to either step-up or step-down the signal for demodulation and monitoring by the controller 140. The controller 140 includes one or more ADCs, filters, and other signal processing devices required to generate digital representations of the magnitude of the in-phase signal I and quadrature signal Q. The controller 140 identifies a magnitude of the sensing current A at a given time as a Pythagorean sum of the in-phase and quadrature components in each sample, as illustrated in the following equation: $A=\sqrt{I^2+Q^2}$. The controller 140 measures the demodulated signal at a predetermined frequency, such as a 100 KHz sampling rate with a 10 μsec period between each sample, to identify changes in the magnitude A of the complex valued signal.

As the motor 112 rotates the blade 108, the rotating blade 108 comes into contact with different objects, including blocks of wood and other work pieces. A small portion of the charge that accumulates on the blade 108 flows into the work piece. The electrical conductivity of the wood work piece is, however, quite low, and the controller 140 in the sensing circuit continues to enable the motor 112 to rotate the saw blade 108. For example, when the blade 108 engages a block of wood, the controller 140 typically measures a small drop in the sensing current A, but the drop in the sensing current is identified as corresponding to wood or another material with low electrical conductivity.

While work pieces, such as wood, have low electrical conductivity, another object, such as a part of the human body, has a much higher electrical conductivity and absorbs a much greater portion of the charge on the blade 108 as the part approaches the blade 108. In FIG. 2 a portion of a human body 164, such as a hand, finger, or arm, is represented by a charge cloud indicating the flow of charge from the blade 108 to the human body. The controller 140 identifies imminent contact between the human body 164 and the blade 108 as a rapid drop in the magnitude A of the sensing current at the time when the human body 164 nears the blade 108. In response to the rapid drop in the magnitude of the sensing signal, the controller 140 deactivates the motor 112, engages the blade arrest device 132 to halt the motion of the blade 108, and optionally retracts the blade 108 before the blade contacts the human body 164.

In the configuration of FIG. 2, the saw blade 108 is a circular saw blade with a plurality of teeth arranged around the circumference of the blade. The teeth engage work pieces to cut the work pieces during normal operation of the saw. The teeth in the blade 108 also accumulate electrical charge from the sensing current. The teeth on the saw blade facilitate discharge of the electrical charge accumulated on the saw blade 108 to the human body 164 as the human body approaches the saw blade 108. In some configurations, an electrical arc between the human body 164 and the tips of the teeth in the saw blade 108 enables the charge accumulated on the blade 108 to flow into the human 164 prior to the human 164 actually contacting the blade 108. The arc distance is typically on the order of a few millimeters. The controller 140 identifies the drop in the magnitude A of the sensing current and halts the blade 108 in response to discharge from the blade 108 due either to direct contact or close proximity between the human 164 and the blade 108.

In the configuration of FIG. 2, the human body has sufficient conductivity and capacity to draw charge from the blade 108 even when the printed circuit card 102 is isolated from earth ground and when the human body 164 is isolated from earth ground, such as when a human operator wears shoes with rubber soles. Thus, while the printed circuit card 102 and the human 164 do not share a common electrical ground, the controller 140 continues to identify contact between the human 164 and the blade 108 through identification of a rapid decrease in the identified sensing current amplitude A. While the absolute value of the amplitude A may vary during operation of the saw 100, the controller 140 can still identify contact with the human 164 in response to the magnitude and time of the decrease in the relative value of the amplitude A. During operation of the saw 100, the controller 140 is configured to identify contact with the human 164 and to deactivate the motor 112 and engage the blade arrest mechanism 132 to halt the saw blade 108 in a time period of approximately 1 millisecond.

In the saw 100, the controller 140 deactivates the electrical motor 112 in response to identification of contact between the blade 108 and a portion of a human. In the saw 100, the saw blade 108 generally continues rotating for a period of several seconds due to the momentum that the saw blade 108 accumulates during operation. The blade arrest device 132 is configured to either halt the saw blade 108 in a much shorter period of time, to drop the saw blade 108 below the table 104 to retract the saw blade 108 from contact with the human, or to both halt and retract the blade 108. In the saw 100, the blade arrest 132 includes a brake mechanism that halts the rotation of the blade 108. Additionally, the blade arrest 132 withdraws the blade 108 below the surface of the table 104. In other power tool embodiments, the moving implement halts in a short period of time after deactivation of an actuator without the requirement for an additional brake mechanism.

In addition to sensing contact between an object and the saw blade 108 when the saw blade 108 is moving, the sensing circuit in the saw 100 is configured to identify if the saw blade 108 is moving when the motor 112 is deactivated. For example, the controller 140 identifies a period of time when the saw blade 108 continues to rotate after an operator closes the switch 110 and runs the saw 100 to cut one or more work pieces, and subsequently opens the switch 110 to deactivate the motor 112. As described in more detail below, the controller 140 samples the sensing current that passes through the blade 108 after the motor 112 is deactivated to identify whether the saw blade 108 is in motion.

FIG. 2 depicts a table saw as an illustrative example of a power tool that is configured to identify movement of an implement, which is the saw blade 108, when the saw blade 108 is moving while an actuator, which is the electric motor 112, is deactivated. Alternative embodiments are envisioned that incorporate the sensing circuit of FIG. 2 into a wide range of power tools including, but not limited to, handheld electric drills, drill presses, handheld circular saws, reciprocating saws, band saws, routers, grinders, and any other power tool with implements that continue moving for a time after an actuator in the power tool is deactivated.

Figure 3A:
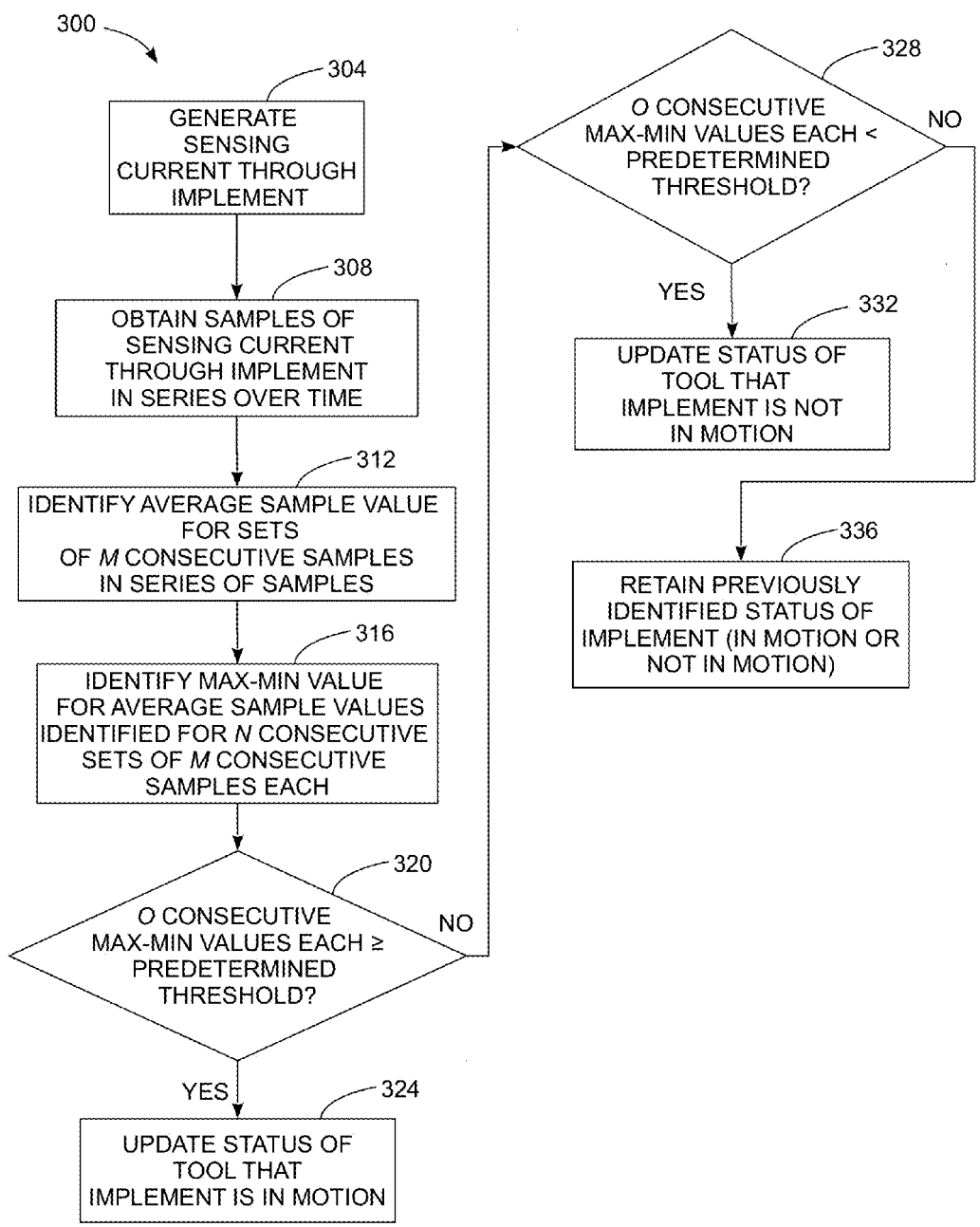
FIG. 3A is a flow diagram of a process for identifying if an implement in a power tool is moving.

FIG. 3A depicts a process 300 for identifying whether an implement in a power tool is moving or not moving. FIG. 3A is described in conjunction with the saw 100 of FIG. 2 for illustrative purposes. In the discussion below, a reference to the process 300 performing a function or action refers to one or more processors, such as the controller 140, executing programmed instructions stored in a memory to operate components of the power tool to perform the function or action.

Process 300 begins as the power tool generates the electrical signal for the sensing current that is passed through the implement (block 304). As described above with reference to FIG. 2, the amplified time varying electrical signal from the clock source 144 and amplifier 146 passes through the transformer 150 and the capacitor 124 formed from the capacitive coupling plate 120 and the saw blade 108.

During process 300, the controller 140 obtains samples from the sensing current passing through the implement (block 308). In the saw 100, the controller 140 samples the in-phase component I of the sensing current that is passed through the secondary winding 154 in the transformer 150. The sensing current passing through the primary winding 152 generates a corresponding excitation current in the secondary winding 154, and the demodulator 143A provides the in-phase component I of the sensing current to the controller 140. In one embodiment, process 300 uses the in-phase component I of the sensing current and does not require the controller 140 to receive samples of the quadrature phase component Q from the demodulator 143B. In another embodiment of process 300, the controller uses samples of the quadrature phase component Q of the sensing current that is received from the demodulator 143B to identify motion of the saw blade 108 in the same manner as described for the in-phase component I. In another embodiment of process 300, the controller 140 receives samples of both the in-phase component I and the quadrature phase component Q of the sensing current and identifies motion of the saw blade 108 with reference to both components. The controller 140 includes any additional circuitry, such as filters and ADCs, to generate digital data corresponding to the in-phase and quadrature phase components of the sensing current. The controller 140 obtains a series of samples from the sensing current over time at a predetermined sampling rate such as, for example, a 100 KHz sampling rate with a period of 10 µsec between samples in the series.

Figure 6:
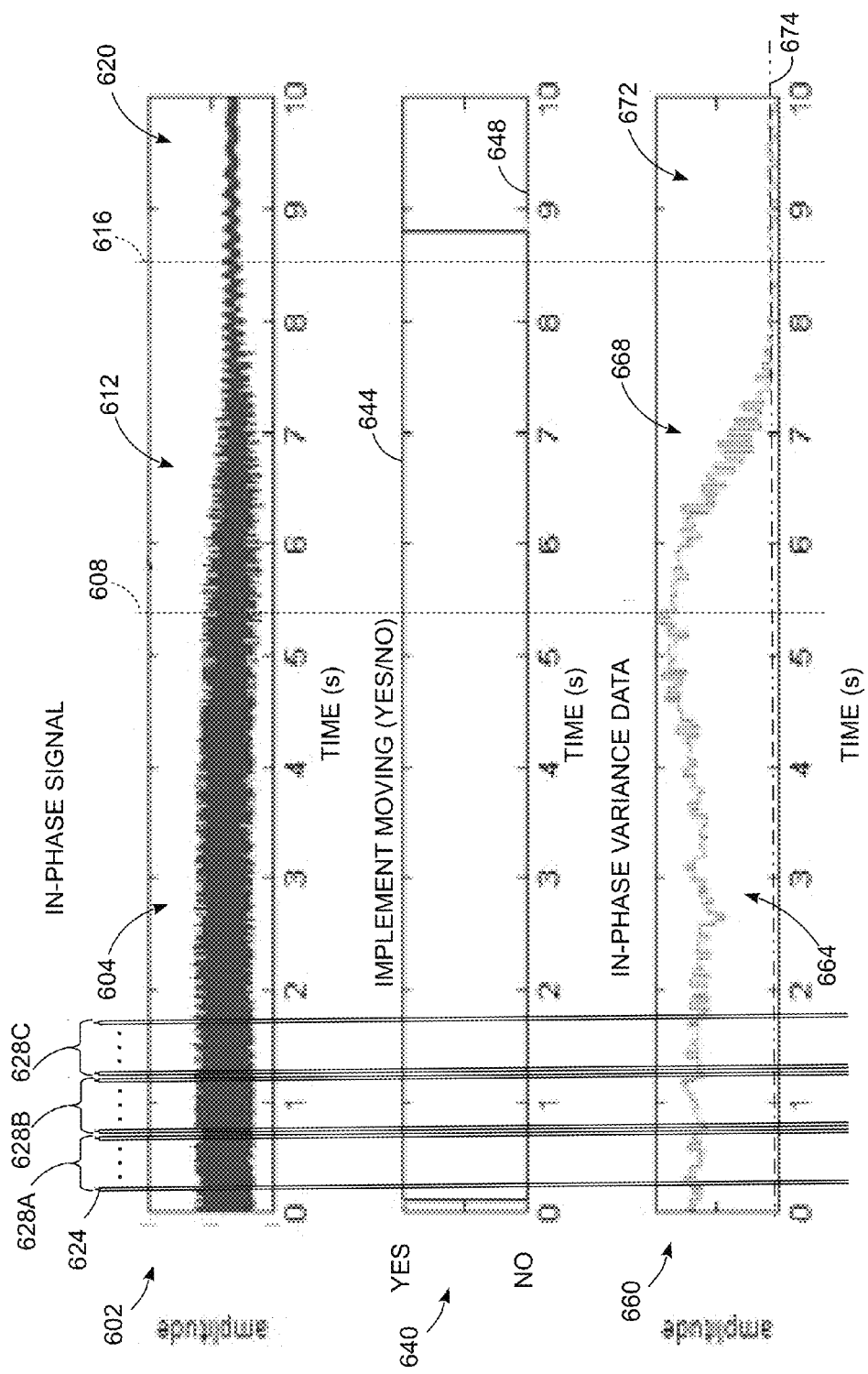
FIG. 6 is a graph depicting a series of samples of the in-phase component of a signal passing through an implement in a power tool over time as the implement decelerates from an operating speed to a halted state.

FIG. 6 depicts a series of samples from the in-phase signal obtained from the sensing current in the saw 100. In FIG. 6, the graph 602 depicts a series of samples that are obtained from the sensing current passing through the implement over time. The samples 604 are generated when the saw blade 108 is rotating while the motor 112 is activated to drive the saw blade 108. At time 608 the motor 112 is deactivated, but the saw blade 108 continues to rotate while decelerating for a few seconds after the motor 112 is deactivated, as depicted in time samples 612. At time index 616 the saw blade 108 comes to a halt and the signal samples 620 are obtained when the saw blade 108 is in a static (non-moving) configuration.

Referring again to FIG. 3A, process 300 continues as the power tool identifies average max-min values for a set of M samples in the series of samples obtained from the sensing current (block 312). In the saw 100, the controller 140 identifies the average value for individual sets of thirty-two consecutive samples (M=32) in the series of samples. Each set of M samples is identified as part of a larger group of N sets, and process 300 identifies the max-min value for a group of N sets as the difference between the largest average value for one set of M samples and the smallest average value for another set of M samples in the group of N sets (block 316).

In the saw 100, the controller identifies one-hundred twenty-eight consecutive average sample set values (N=128) to identify the max-min value over all of the samples in the group. For example, in the saw 100 using a 10 µsec sample period with M=32 and N=128, each max-min value identified in the processing described with reference to block 316 generates a max-min value for a series of M×N (4,096) samples, which corresponds to a time period of approximately forty-one milliseconds.

FIG. 6 depicts a set 624 of M samples, although the size of the set 624 is not drawn to scale for illustrative purposes. The group 628A includes N of the consecutive sets of M samples each for a total of 4,096 samples, and groups 628A, 628B, and 628C depict three consecutive groups, each of which includes 4,096 samples. As described above, in process 300, the controller 140 identifies one of the sets of M samples with the maximum average value and another of the sets M with the minimum average value in each group of N sets. The max-min value identified for each of the groups 628A-628C is the difference between the maximum average value and the minimum average value for the identified sets in each group.

Referring again to FIG. 3A, if a predetermined number of the max-min values identified for a group of O consecutive groups of M×N samples is greater than or equal to a predetermined threshold (block 320), then the power tool identifies that the implement is in motion and the controller updates a status indicating that the implement is in motion (block 324). In the saw 100, if three (O=3) consecutive groups of samples each have a max-min value that is above a predetermined threshold, then the controller 140 identifies the saw blade 108 as being in motion. For example, in FIG. 6 the average max-min value values identified in each of the consecutive groups 628A-628C exceed a predetermined threshold for max-min signals that corresponds to a moving saw blade 108. In the saw 100, the max-min threshold is identified empirically before process 300 begins and the controller 140 retrieves the max-min threshold value from the memory 142 for use in process 300.

In an alternative configuration, process 300 applies a time-averaged low-pass filter to the next identified max-min value for each group of N samples. The time-averaged filter includes an average max-min value corresponding to a series of previously identified max-min values for previous groups of signals. If the identified max-min value for the next group of samples is too far from the average value of the previous groups, the max-min value can be clipped to be within a predetermined range of the low-pass filter. If the average max-min value of the low-pass filter is above the predetermined max-min threshold, then the controller 140 identifies that the saw blade 108 is moving.

The increase in the max-min values that occurs when the saw blade 108 is in motion is believed to be due, at least in part, to variations in the capacitance of the capacitor 124 formed between the saw blade 108 and the plate 120 due to small variations in the distance between the saw blade 108 and the plate 120 while the saw blade 108 moves, and to changes in the air pressure and air flow in the air dielectric between the saw blade 108 and plate 120 that are produced due to the motion of the saw blade 108. The magnitude of max-min values decreases as the blade 108 slows and eventually halts as the variation in the capacitance of the capacitor 124 drops as the blade 108 decelerates to a halt.

In the process 300, if the saw blade 108 is identified as being in motion, the controller 140 updates status data in the memory 142 indicating that the saw blade 10 is in motion. In one embodiment, the controller 140 continues a monitoring process to identify human contact with the saw blade 108 as the saw blade 108 decelerates. The same sensing current generated used in the process 300 is used in another sensing process to identify signal spikes or transients that are generated in response to contact between a portion of a human 164 and the moving saw blade 108. The controller 140 activates the blade arrest 132 to halt the saw blade 108 in response to identifying contact between the human 164 and the moving blade even when the motor 112 is deactivated.

Referring again to FIG. 3A, if the O consecutive groups of samples do not each have a max-min value that is greater than or equal to the predetermined threshold (block 320), then the power tool identifies whether the O consecutive samples each have a max-min value that is less than the max-min threshold (block 328). If each of the O samples is below the predetermined max-min threshold, then the power tool 336 updates a status of the implement to indicate that the implement is not in motion (block 332). In the saw 100, the controller 140 identifies that the saw blade 108 is not in motion if three consecutive max-min samples identified over an approximately 123 millisecond time period are each below the predetermined max-min threshold. Once the saw blade 108 is halted, the controller 140 stores the status information in the memory 142 and is configured to not engage the blade arrest 132 if a human contacts the non-moving blade. For example, if a human operator contacts the saw blade 108 to replace the saw blade 108 while the saw blade 108 is not moving, the controller 140 does not engage the blade arrest device 132.

In some cases, a series of O identified max-min values includes max-min values that are both above and below the predetermined threshold so that the O max-min values are neither all greater than or equal to the threshold (block 320) nor less than the threshold (block 328). In this situation, the power tool retains the previously identified status of motion for the implement (block 336). For example, in the saw 100, the max-min values that are identified in the region 612 while the saw blade decelerates may include some max-min values that are below the predetermined threshold. The controller 140 continues to identify that the saw blade 108 is moving until the max-min values are consistently below the predetermined threshold after the blade halts at time reference 616. As depicted in FIG. 6, the graph 640 depicts the implement as being identified as moving in the time range 644 that extends past time 616 at which the implement halts until the power tool consistently identifies that the max-min values have dropped below the predetermined threshold for at least O consecutive groups of samples in region 648.

Process 300 is performed iteratively to continue to identify the motion of the implement after an actuator in the power tool is deactivated. Process 300 is used with a wide range of power tools where the implement in the power tool can continue moving after an actuator in the power tool is deactivated.

Figure 3B:
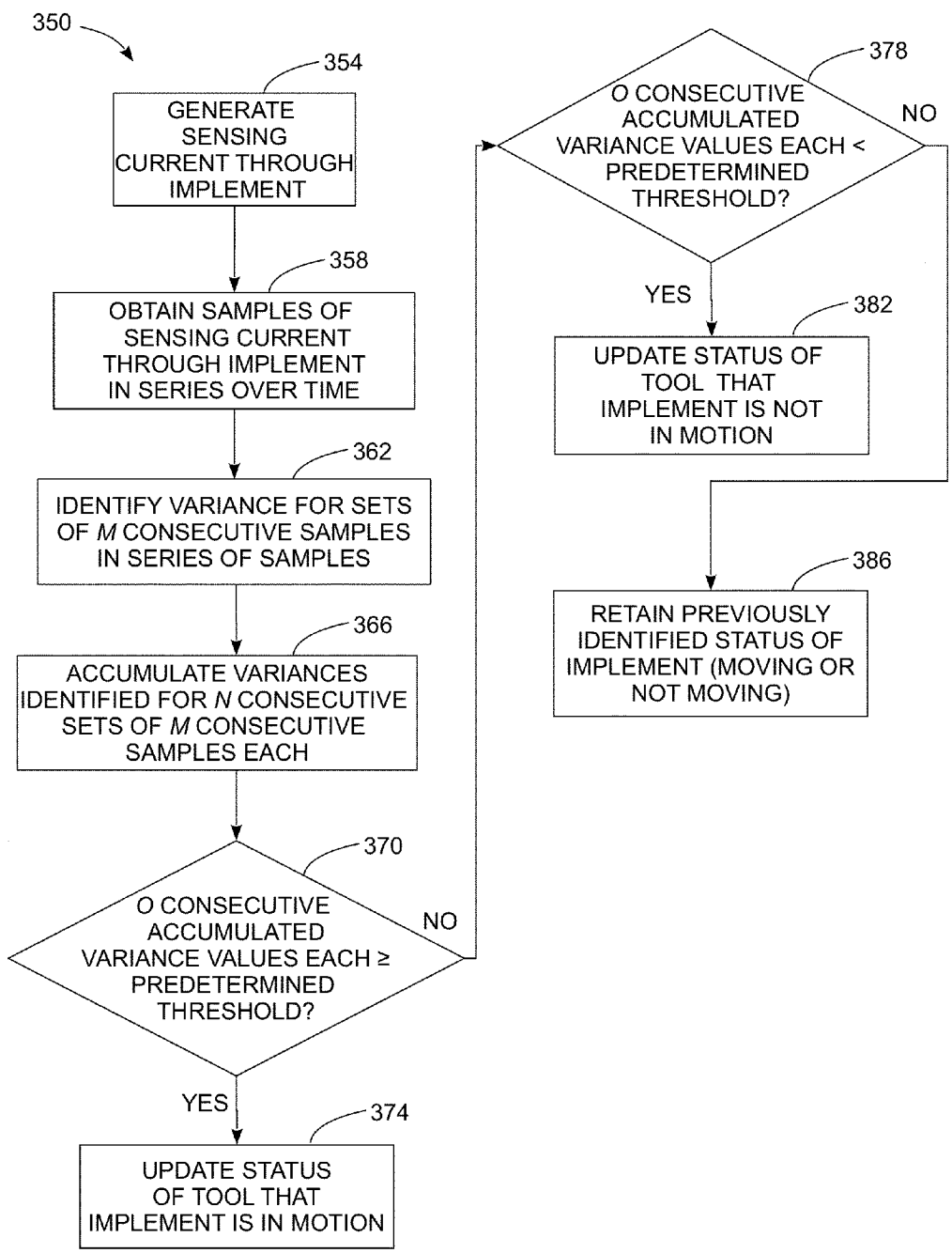
FIG. 3B is a flow diagram of another process for identifying if an implement in a power tool is moving.

FIG. 3B depicts another process 350 for identifying whether an implement in a power tool is moving or not moving. Process 350 is similar to the process 300 of FIG. 3A, but the process 350 identifies if the implement in the power tool is moving with reference to a variance of the series of samples obtained from the in-phase component of the sensing signal instead of the max-min values. FIG. 3B is described in conjunction with the saw 100 of FIG. 2 for illustrative purposes. In the discussion below, a reference to the process 350 performing a function or action refers to one or more processors, such as the controller 140, executing programmed instructions stored in a memory to operate components of the power tool to perform the function or action.

Process 350 begins by generating a sensing current through an implement in a power tool (block 354) and obtaining a series of samples of the in-phase component of the sensing signal over time (block 358). The processing of blocks 354-358 is performed in the same manner as the processing described above with reference to blocks 304-308, respectively, in the process 300.

Process 350 continues by identifying a variance for sets of M consecutive samples in the sample series (block 362). As used herein, the term "variance" refers to a square of the deviation of the values of the M samples from the mean value of the samples M, which is expressed mathematically as:

$$\text{Var}(\text{Set}) = \left(\frac{M-1}{M}\right)\sum_{n=1}^{M}(\text{Set}(n) - \mu_M)^2$$

where Set(n) is the $n^{th}$ sample in the set, M is the number of samples in the set (32 samples in the embodiment of the saw 100), $\mu_M$ is the average value of the samples in the set, and $$\frac{M-1}{M}$$

is a correction factor applied to the variance because the variance is being identified from a finite number of M samples. In the saw 100, the controller 140 identifies the variance values for consecutive sets of M samples, each set consisting of samples from the series of samples obtained from the sensing current.

Process 350 continues to identify the variance for sets of M samples and to accumulate the variances for groups of N sets of the samples (block 366). In the saw 100, the controller 140 identifies variance values for each of the M sets of samples and generates a sum from the variance values over N identified variance values, where N=128 in the embodiment of the saw 100. Thus, the saw 100 identifies a cumulative variance value over a series of M×N (4,096) samples, which corresponds to a time interval of approximately 41 milliseconds using the 10 µsec sampling period in the saw 100. The generation of a sum of variance values using smaller groups of values is less computationally intensive than identifying a variance over the larger set of 4,096 samples generated in the approximately 41 millisecond time period. In an alternative embodiment, a controller identifies the variance over the predetermined time period using all of the samples in the time period instead.

FIG. 6 depicts sample variance values in a graph 660 including variance values 664 that are identified for each set of M samples when the motor 112 is activated, another region 668 depicting the variance values when the motor 112 is deactivated and the saw blade 108 is decelerating, and another region 672 depicting the variance values when the saw blade 108 is halted. In the graph 660, a predetermined variance threshold 674 corresponds to a variance threshold below which the saw blade 108 is assumed to be non-moving.

Referring again to FIG. 3B, the process 350 continues as the power tool identifies whether the accumulated variance values from O consecutive groups of samples are each greater than or equal to a predetermined threshold (block 370). In the saw 100, the controller 140 compares the identified accumulated variance values from each of three (O=3) periods, such as the periods 628A-628C depicted in FIG. 6, to a predetermined variance threshold value that is retrieved from the memory 142. In the saw 100, the accumulated variance threshold is identified empirically before process 350 begins and the controller 140 retrieves the accumulated variance threshold value from the memory 142 for use in process 350. In an alternative embodiment, the controller 140 implements a time-averaged low-pass filter to identify whether the time average of the accumulated variance values exceeds the predetermined threshold in processing similar to that described above with reference to block 320 in the process 300. If the accumulated variance values are greater than or equal to the predetermined threshold for each of the O consecutive groups, then the controller 140 updates the status data in the memory 140 to indicate that the saw blade 108 is still moving (block 374) and the controller 140 can optionally identify human contact with the saw blade 108 and engage the blade arrest 132 to halt the blade.

If the accumulated variance values for the O consecutive groups of samples are each below the predetermined accumulated variance threshold (block 378), then the power tool updates the status indicating that the implement is not in motion (block 382). For example, in the saw 100 if the controller 140 identifies that the accumulated variance values for three consecutive groups of samples are each below the predetermined threshold, then the controller 140 identifies that the saw blade 108 is not in motion. In the saw 100, the controller 140 identifies the accumulated variance value for each group of N samples over a period of approximately 41 milliseconds, and the controller 140 subsequently identifies whether the accumulative variance in three consecutive groups O over a period of approximately 123 milliseconds are each below the predetermined accumulated variance threshold. The controller 140 updates the status data in the memory 142 indicating that the saw blade 108 is not moving.

In some cases, a series of O identified accumulated variance values includes accumulated variance values that are both above and below the predetermined threshold so that the O groups of samples are neither all greater than or equal to the threshold (block 370) nor less than the threshold (block 378). In this situation, the power tool retains the previously identified status of motion for the implement (block 386). For example, in the saw 100, the variance values that are identified in the region 612 while the saw blade decelerates may include some accumulated variance values that are below the predetermined threshold. The controller 140 continues to identify that the saw blade 108 is moving until the accumulated variance values are consistently below the predetermined threshold for at least O consecutive groups after the blade halts at time reference 616. As depicted in FIG. 6, the graph 640 depicts the implement as being identified as moving in the time range 644 that extends past time 616 at which the implement halts until the power tool consistently identifies that the accumulated variance values have dropped below the predetermined threshold for at least O consecutive groups of samples in region 648.

Process 350 is performed iteratively to continue to identify the motion of the implement after an actuator in the power tool is deactivated. Process 350 is used with a wide range of power tools where the implement in the power tool can continue moving after an actuator in the power tool is deactivated.

Figure 4:
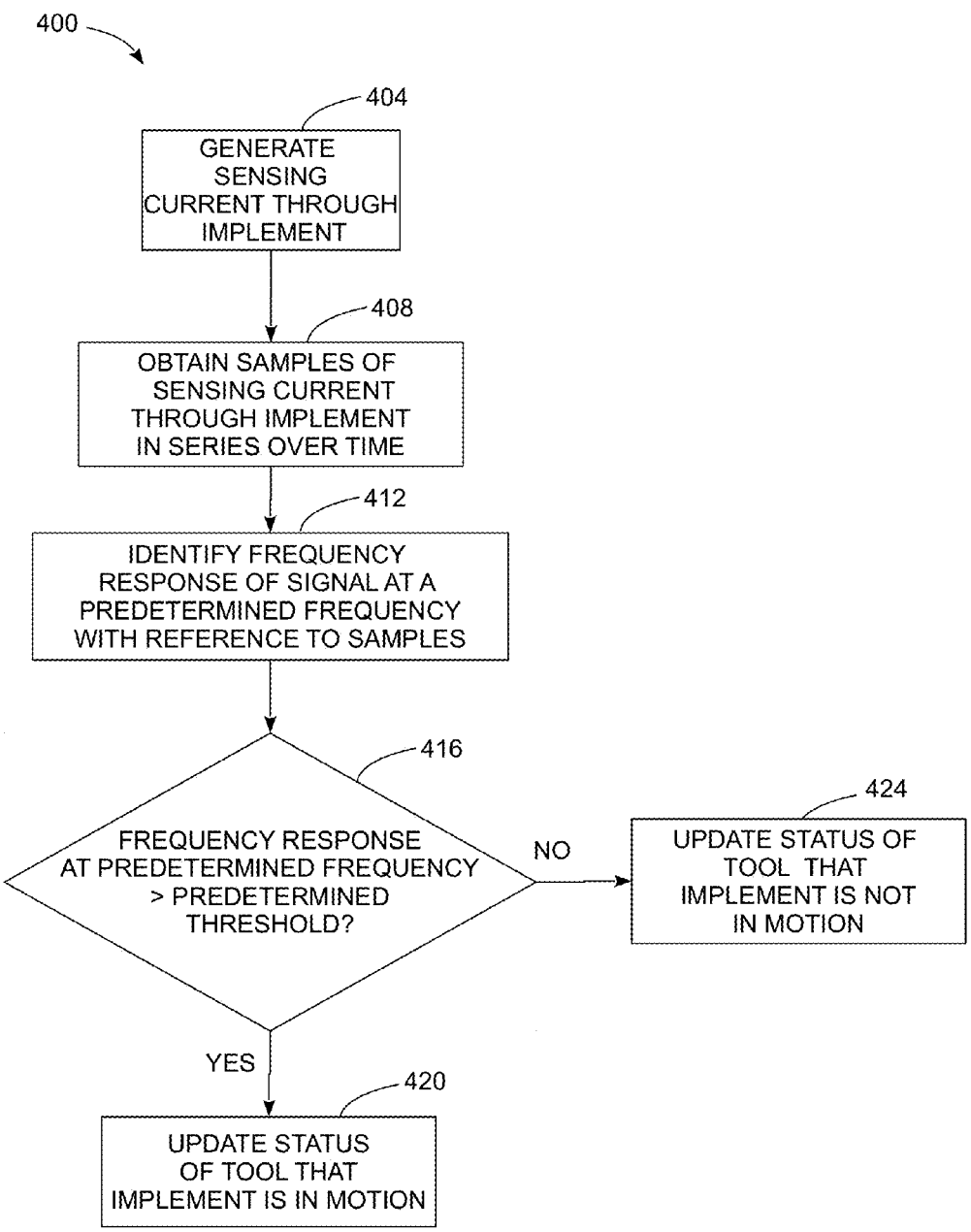
FIG. 4 is a flow diagram of another process for identifying if an implement in a power tool is moving.

FIG. 4 depicts another process 400 for identifying whether an implement in a power tool is moving. The process 400 is directed to identifying whether the implement in the power tool is moving with reference to an identified frequency response in samples that are obtained from a sensing current that passes through the implement in the power tool. In the discussion below, a reference to the process 400 performing a function or action refers to one or more processors, such as the controller 140, executing programmed instructions stored in a memory to operate components of the power tool to perform the function or action.

Process 400 begins as the power tool generates the electrical signal for the sensing current that is passed through the implement (block 404). As described above with reference to FIG. 2, the amplified time varying electrical signal from the clock source 144 and amplifier 146 passes through the transformer 150 and the capacitor 124 formed from the capacitive coupling plate 120 and the saw blade 108.

During process 400, the controller 140 obtains samples from the sensing current passing through the implement (block 408). In the saw 100, the controller 140 samples the in-phase component I of the sensing current that is passed through the secondary winding 154 in the transformer 150. The sensing current passing through the primary winding 152 generates a corresponding excitation current in the secondary winding 154, and the demodulator 143A provides the in-phase component I of the sensing current to the controller 140. In one embodiment, process 400 uses the in-phase component I of the sensing current and does not require the controller 140 to receive samples of the quadrature phase component Q from the demodulator 143B. In another embodiment of process 400, the controller uses samples of the quadrature phase component Q of the sensing current that is received from the demodulator 143B to identify motion of the saw blade 108 in the same manner as described for the in-phase component I. In another embodiment of process 400, the controller 140 receives samples of both the in-phase component I and the quadrature phase component Q of the sensing current and identifies motion of the saw blade 108 with reference to both components. The controller 140 includes any additional circuitry, such as filters and ADCs, to generate digital data corresponding to the in-phase and quadrature phase components of the sensing current. The controller 140 obtains a series of samples from the sensing current over time at a predetermined sampling rate such as, for example, a 100 KHz sampling rate with a period of 10 μsec between samples in the series.

Process 400 continues as the power tool identifies a frequency response of the sensing current with reference to the series of samples obtained from the sensing current (block 412). In the saw 100, the controller 140 identifies a frequency response of the samples at a frequency of approximately 60 Hz, because the motion of the saw blade 108 generates a signal response at a 60 Hz frequency while the saw blade 108 is rotating, but the 60 Hz signal is not present in the sampled sensing current when the saw blade 108 is not moving. Other power tool embodiments include a frequency response at different frequencies when the implement is moving.

FIG. 7 depicts a spectrum graph 704 generated from the samples obtained from the sensing current when the saw blade 108 in the saw 100 is moving. The peaks 708A and 708B are present at frequencies of −60 Hz and 60 Hz, respectively. Some signal processing techniques use only a single side-band, such as the positive side-band including the 60 Hz peak, to analyze the frequency spectrum and to identify the peak in a single frequency range. In the saw 100, the controller 140 includes one or more filters, such as pass-band filters, to isolate the frequency range of interest for identifying the frequency response of the samples obtained from the sensing current.

Referring again to FIG. 4, if the identified response at the predetermined frequency exceeds a predetermined threshold (block 416), then the power tool identifies that the implement is moving (block 420). If the identified response at the predetermined frequency is below the predetermined threshold, then the power tool identifies that the implement is halted (block 424). In the saw 100, the controller 140 compares the identified frequency response at 60 Hz to a predetermined threshold that is determined empirically and stored in the memory 142 prior to commencing the process 400. The threshold is depicted graphically in FIG. 7 as the threshold line 712. The peaks 708A and 708B exceed the predetermined threshold, but in the graph 754 the frequency response at 60 Hz falls well below the predetermined threshold 712. As described above, if the controller 140 identifies that the saw blade 108 is moving even if the motor 112 is deactivated, then the controller 140 optionally identifies contact between the saw blade 108 and a portion of a human body and operates the blade arrest 132 to halt the saw blade 108.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for identifying motion of an implement in a power tool comprising:
generating, with a clock source in the power tool, a time varying electrical signal that passes through the implement;
obtaining, with a controller in the power tool, a plurality of samples of the electrical signal that passes through the implement during a period in which an actuator that is operatively connected to the implement to move the implement is deactivated;
identifying, with the controller, a parameter for the plurality of samples corresponding to a variation in values of predetermined groups of samples in the plurality of samples, the identifying comprising:
identifying, with the controller, a variance for each group of samples in a plurality of at least two groups of samples of the electrical signal; and
generating, with the controller, a summed variance parameter as a sum of the variance for one group of samples with the variance for another group of samples in the at least two groups of samples;
updating, with the controller, a status for the implement stored in a memory within the power tool with a first status indicating that the implement is not moving with reference to the identified parameter being less than a predetermined threshold, the updating of the first status further comprising:
comparing, with the controller, the summed variance parameter to the predetermined threshold; and
updating, with the controller, the status for the implement with the first status indicating that the implement is not moving in response to both the summed variance parameter and another summed variance parameter identified in a previous plurality of groups of samples being less than the predetermined threshold;
updating, with the controller, a status for the implement in the memory with a second status indicating that the implement is moving with reference to the identified parameter being greater than the predetermined threshold; and
activating, with the controller, an arrest mechanism in the power tool to halt or retract the implement while the actuator is deactivated only in response to the status of the implement being the second status and in further response to detection of contact between a human operator and the implement.

2. The method of claim 1, the updating of the status with the second status further comprising:
comparing, with the controller, the summed variance parameter to the predetermined threshold; and
updating, with the controller, the status for the implement with the second status indicating that the implement is moving in response to both the summed variance parameter and another summed variance parameter identified in a previous plurality of groups of samples being greater than the predetermined threshold.

3. A power tool comprising:
an actuator configured to move an implement;
a clock source configured to generate a time varying electrical signal that passes through the implement;
a memory;
an arrest mechanism configured to halt motion of the implement or retract the implement from contact with a human operator; and
a controller operatively connected to the actuator, the memory, and the arrest mechanism, the controller being configured to:
obtain a plurality of samples of the electrical signal during a period in which the actuator is deactivated;
identify a parameter for the plurality of samples corresponding to a variation in values of predetermined groups of samples in the plurality of samples, the controller being further configured to:
identify a variance for each group of samples in a plurality of at least two groups of samples of the electrical signal; and
generate a summed variance parameter as a sum of the variance for one group of samples with the variance for another group of samples in the at least two groups of samples;
update a status for the implement stored in the memory with a first status indicating that the implement is not moving with reference to the identified parameter being less than a predetermined threshold stored in the memory, the controller being further configured to:
compare the summed variance parameter to the predetermined threshold; and
update the status for the implement in the memory with the first status indicating that the implement is not moving in response to both the summed variance parameter and another summed variance parameter identified in a previous plurality of groups of samples being less than the predetermined threshold in the memory;
update the status for the implement in the memory with a second status indicating that the implement is moving with reference to the identified parameter being greater than the predetermined threshold stored in the memory; and
activate the arrest mechanism to halt or retract the implement while the actuator is deactivated only in response to the status of the implement being the second status and in further response to detection of contact between the human operator and the implement.

4. The power tool of claim 3, the controller being further configured to:
compare the summed variance parameter to the predetermined threshold; and
update the status for the implement in the memory with the second status indicating that the implement is moving in response to both the summed variance parameter and another summed variance parameter identified in a previous plurality of groups of samples being greater than the predetermined threshold in the memory.

* * * * *